United States Patent
Kesterson et al.

(10) Patent No.: US 9,379,625 B2
(45) Date of Patent: Jun. 28, 2016

(54) CURRENT METER FOR LOAD MODULATION COMMUNICATION RECEIVER ARCHITECTURE

(71) Applicant: Dialog Semiconductor Inc., Campbell, CA (US)

(72) Inventors: John William Kesterson, Seaside, CA (US); Andrey B. Malinin, Fort Collins, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 0 days.

(21) Appl. No.: 14/565,010

(22) Filed: Dec. 9, 2014

(65) Prior Publication Data

US 2015/0188442 A1   Jul. 2, 2015

Related U.S. Application Data

(60) Provisional application No. 61/920,997, filed on Dec. 26, 2013.

(51) Int. Cl.
  *H02M 3/335* (2006.01)
  *H02M 1/00* (2006.01)

(52) U.S. Cl.
  CPC .. *H02M 3/33523* (2013.01); *H02M 2001/0009* (2013.01)

(58) Field of Classification Search
  CPC .............. H02M 3/33507; H02M 3/33523; H02M 3/33592; H02M 1/4208; Y02B 70/126
  USPC ............. 363/21.12–21.18, 78, 95, 97
  See application file for complete search history.

(56) References Cited

U.S. PATENT DOCUMENTS

| | | | |
|---|---|---|---|
| 6,333,624 B1 | 12/2001 | Ball et al. | |
| 7,719,860 B2 | 5/2010 | Usi | |
| 7,821,797 B2 | 10/2010 | Nishiyama et al. | |
| 7,864,546 B2 | 1/2011 | Dhuyvetter et al. | |
| 7,911,814 B2 * | 3/2011 | Tao | H02M 3/33507 363/21.12 |
| 8,018,743 B2 * | 9/2011 | Wang | H02M 3/33507 323/284 |
| 8,125,799 B2 | 2/2012 | Zhu et al. | |
| 8,233,292 B2 * | 7/2012 | Ren | H02M 3/33507 363/21.04 |
| 8,605,462 B2 * | 12/2013 | Yang | H02M 3/3376 363/21.02 |
| 2002/0027787 A1 * | 3/2002 | Nishida | H02M 3/3385 363/21.16 |

(Continued)

FOREIGN PATENT DOCUMENTS

| | | |
|---|---|---|
| CN | 101002375 A | 7/2007 |
| CN | 101841250 A | 9/2010 |
| CN | 102231605 A | 11/2011 |

OTHER PUBLICATIONS

PCT International Search Report and Written Opinion, PCT Application No. PCT/US2014/070978, Mar. 31, 2015, 13 pages.

(Continued)

*Primary Examiner* — Adolf Berhane
(74) *Attorney, Agent, or Firm* — Fenwick & West LLP

(57) ABSTRACT

A load device on a secondary side of an isolated switching power converter communicates a digital message to a primary side controller by modulating the load current in accordance with certain predefined timing patterns. The load current modulation is detected by the primary side controller and the digital message is decoded based on the predefined timing patterns. The load device may encode the digital message in order to control the primary side controller to operate in a particular mode compatible with the load device.

20 Claims, 14 Drawing Sheets

(56) References Cited

U.S. PATENT DOCUMENTS

| | | | |
|---|---|---|---|
| 2008/0112193 A1 | 5/2008 | Yan et al. | |
| 2008/0130325 A1* | 6/2008 | Ye | H02M 3/33507 363/21.14 |
| 2008/0157743 A1 | 7/2008 | Martin et al. | |
| 2008/0192515 A1* | 8/2008 | Huynh | H02M 3/33507 363/21.12 |
| 2008/0259655 A1* | 10/2008 | Wei | H02M 3/335 363/21.18 |
| 2009/0015227 A1 | 1/2009 | Wong et al. | |
| 2009/0059632 A1 | 3/2009 | Li et al. | |
| 2009/0141520 A1* | 6/2009 | Grande | H02M 3/33523 363/21.16 |
| 2009/0230930 A1 | 9/2009 | Jain et al. | |
| 2009/0279334 A1 | 11/2009 | Xiong et al. | |
| 2010/0054000 A1* | 3/2010 | Huynh | H02M 3/33507 363/21.16 |
| 2010/0103703 A1 | 4/2010 | Nishiyama et al. | |
| 2010/0164455 A1 | 7/2010 | Li et al. | |
| 2010/0195355 A1* | 8/2010 | Zheng | H02M 3/33507 363/21.12 |
| 2010/0208500 A1* | 8/2010 | Yan | H02M 3/33523 363/21.12 |
| 2011/0096572 A1* | 4/2011 | Liang | H02M 1/36 363/21.12 |
| 2011/0096573 A1* | 4/2011 | Zhu | H02M 3/33523 363/21.17 |
| 2011/0261596 A1* | 10/2011 | Zong | H02M 3/33507 363/21.13 |
| 2012/0051099 A1* | 3/2012 | Funaba | H02M 1/08 363/21.17 |
| 2012/0081927 A1 | 4/2012 | Matsumoto | |
| 2012/0176819 A1* | 7/2012 | Gao | H02M 1/36 363/21.12 |
| 2012/0262956 A1 | 10/2012 | DeHaven | |
| 2012/0299566 A1 | 11/2012 | Hsu | |
| 2013/0088898 A1* | 4/2013 | Gao | H02M 3/335 363/21.16 |
| 2013/0107584 A1* | 5/2013 | Li | H02M 1/08 363/21.12 |
| 2013/0148387 A1* | 6/2013 | Ren | H02M 1/36 363/21.16 |
| 2013/0181635 A1* | 7/2013 | Ling | H02M 3/33507 315/297 |
| 2013/0235621 A1* | 9/2013 | Yan | H02M 3/33507 363/21.12 |
| 2013/0343101 A1* | 12/2013 | Zhang | H02M 1/36 363/21.18 |
| 2014/0016375 A1* | 1/2014 | Gao | H02M 3/33507 363/21.16 |
| 2014/0036549 A1* | 2/2014 | Li | H02M 3/33507 363/21.12 |
| 2014/0160810 A1 | 6/2014 | Zheng | |
| 2014/0192566 A1* | 7/2014 | Yang | H02M 3/33523 363/21.15 |
| 2014/0233269 A1* | 8/2014 | Feng | H02M 3/335 363/21.12 |
| 2014/0268915 A1* | 9/2014 | Kong | H02M 3/33592 363/21.14 |
| 2014/0268919 A1* | 9/2014 | Yao | H02M 3/33523 363/21.15 |
| 2014/0301116 A1* | 10/2014 | Zhang | H02M 3/33515 363/21.15 |
| 2014/0355316 A1* | 12/2014 | Wu | H02M 1/4258 363/21.16 |
| 2015/0160270 A1* | 6/2015 | Shi | G01R 19/0084 363/21.13 |

OTHER PUBLICATIONS

Chinese Office Action, Chinese Application No. 201410090425.6, Dec. 23, 2015, 12 pages (with concise explanation of relevance).

* cited by examiner

CURRENT METER FOR LOAD MODULATION COMMUNICATION RECEIVER ARCHITECTURE

RELATED APPLICATIONS

This application claims the benefit of U.S. Provisional Patent Application No. 61/920,997 to John Kesterson and Andrey Malinin, entitled "Current Meter for Load Modulation Communication Receiver Architecture," filed on Dec. 26, 2013, the content of which is incorporated by reference herein.

BACKGROUND

1. Technical Field

The disclosed embodiments relate generally to a switch mode power converter, and more specifically, to a switch mode power converter that facilitates communication from a load device coupled to a secondary side of the power supply to a primary side controller.

2. Description of the Related Arts

In a conventional isolated switching power supply such as a flyback power converter, a switch controller located on the primary side of the power supply regulates power to the load by controlling on-times and off-times of a switch based upon one or more feedback signals representing output power, output voltage, and/or output current. It is often desirable to communicate messages from the load device to the primary side controller so that the load device can communicate a desired voltage, current, or operating mode to be provided by the power converter. In devices that distribute power through a standard Universal Serial Bus (USB) cable, there are different conventional methods of communication. Some conventional systems rely on communication through the D+/D− data lines of USB during negotiation stages where the power delivery method can be changed to different modes. However, it is often undesirable to use the D+/D− lines because connecting these lines to anything other than their normal high-speed communication path may impact the bit error rate. Another disadvantage of communicating operating mode information using the D+/D− data lines is that it such solutions typically require a communication integrated circuit on the secondary side of the charger/adapter, thereby increasing overall cost of the system.

SUMMARY

A switching power converter provides power to an electronic device based on a digital message generated by the electronic device. The electronic device generates the digital message by modulating a load current to the electronic device according to a predefined pattern. A transformer electrically isolates a secondary side of the switching power converter coupled to the electronic device from a primary side. A load current detector obtains samples of a primary side voltage sense signal representative of an output voltage to the electronic device and samples of a current sense signal representing a primary side current. The voltage sense signal and the current sense signal vary based on the modulated load current to the electronic device. The load current detector generates a load current signal representing a waveform of the modulated current to the electronic device. A digital decoder decodes the load current signal to recover the digital message encoding by the electronic device. A power controller controls switching of a switch to control at least one of an output voltage and an output current to the electronic device based on the voltage sense signal, the current sense signal, and the digital message.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

The teachings of the embodiments of the present invention can be readily understood by considering the following detailed description in conjunction with the accompanying drawings.

FIG. (FIG.) 1 illustrates an embodiment of a switching power converter.

DETAILED DESCRIPTION OF EMBODIMENTS

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The Figures (FIG.) and the following description relate to the preferred embodiments of the present invention by way of illustration only. It should be noted that from the following discussion, alternative embodiments of the structures and methods disclosed herein will be readily recognized as viable alternatives that may be employed without departing from the principles of the present invention.

Reference will now be made in detail to several embodiments of the present invention(s), examples of which are illustrated in the accompanying figures. It is noted that wherever practicable similar or like reference numbers may be used in the figures and may indicate similar or like functionality. The figures depict embodiments of the present invention for purposes of illustration only. One skilled in the art will readily recognize from the following description that alternative embodiments of the structures and methods illustrated herein may be employed without departing from the principles of the invention described herein.

A load device on a secondary side of an isolated switching power converter communicates a digital message to a primary side controller by modulating the load current in accordance with certain predefined timing patterns. The load current modulation is detected by the primary side controller and the digital message is decoded based on the predefined timing patterns. The load device may encode the digital message in order to control the primary side controller to operate in a particular mode compatible with the load device. In one embodiment, where the power converter is coupled to the load device via a USB cable, the digital message may be transmitted over the Vbus lines that provide power to the load device.

Figure 1:
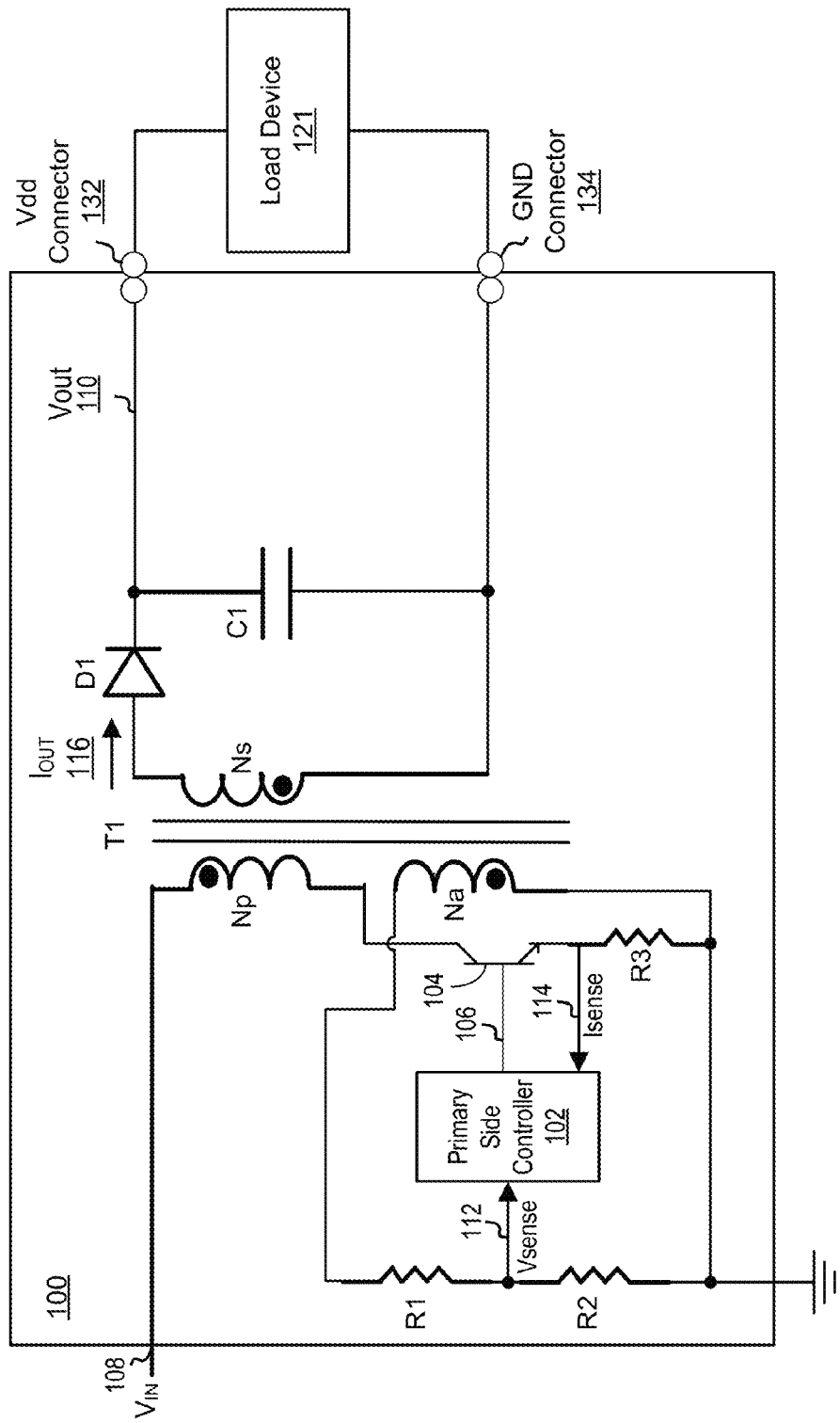

FIG. 1 is a circuit diagram illustrating an embodiment of a switching power converter 100 (e.g., a primary-side fly-back switching power converter). The switching power converter 100 provides power to a load device 121 via a Vdd connector 132 and a ground (GND) connector 134. In the case of a USB controller, the Vdd connector 132 and the GND connector 134 may correspond to the Vbus and GND lines respectively of the standard USB connector pin out. The switching power converter 100 includes, among other components, a transformer T1 having a primary winding Np, a secondary winding Ns, and an auxiliary winding Na, a switch 104 (e.g., a transistor), a primary side controller 102, an output rectifier diode D1, resistors R1, R2, R3, and output filter capacitor C1.

An input voltage ($V_{IN}$) 108, typically a rectified AC voltage, is input to power converter 100. The primary side controller 102 controls the on state and the off state of the switch 104 using the switch control signal 106 with on-times ($T_{ON}$) and off-times ($T_{OFF}$). When the switch 104 is turned on during its on-time, energy is stored in the primary side windings Np of the transformer T1. The voltage across the secondary winding Ns is negative and the diode D1 is reverse biased, blocking transfer of energy to the load device 121. In this state, energy is supplied to the load device 121 via capacitor C1. When the switch 104 is turned off, the energy stored in the primary winding Np of the transformer T1 is released to the secondary winding Ns of the transformer T1. The diode D1 becomes forward biased enabling transfer of energy stored in the transformer T1 to the load device 121 and recharging the capacitor C1.

The resistors R1 and R2 form a voltage divider coupled in series with the auxiliary winding Na of the transformer T1, and produce the sensed voltage ($V_{SENSE}$) 112, which can be used to estimate the output voltage ($V_{OUT}$) 110. The resistor R3 is coupled in series with the switch 104 to produce a voltage ($I_{SENSE}$) 114 representing a primary side current which can be used in conjunction with $V_{SENSE}$ 112 to estimate the output current $I_{OUT}$ 116.

In normal operation, the controller 102 monitors $V_{SENSE}$ 112 and/or $I_{SENSE}$ 114 and controls switching of the switch 104 to maintain a regulated output. For example, in a constant voltage mode (CVM), the controller 102 controls switching of the switch 104 to maintain $V_{OUT}$ 110 substantially near a desired regulation voltage $V_{REF}$ (for example, within an allowable error range). In a constant current mode (CCM), the controller 102 controls switching of the switch 104 to maintain $I_{OUT}$ 116 substantially near a desired regulation current $I_{REF}$ (for example, within an allowable error range).

The controller 102 receives the voltage feedback signal $V_{SENSE}$ and the current feedback signal $I_{SENSE}$ and generates a switch control signal that is provided to the switch 104. The switch control signal controls the on/off states of the switch 104. In general, the controller 102 can implement any number of control schemes suitable for switch-mode power converters 100, such as pulse-width-modulation (PWM) or pulse-frequency-modulation (PFM), and/or their combinations. In one embodiment, the controller 102 outputs a control signal that causes the ON time (or duty cycle) of the power switch 104 to increase, during a certain switching cycle, in order to increase power delivery to the load during that switching cycle, or to decrease in order to decrease power delivery to the load during that switching cycle.

The primary side auxiliary winding Na of the transformer T1 allows for a low voltage $V_{SENSE}$ 112 to be generated because the voltage can be scaled down based on the turn ratio of the secondary winding Ns and auxiliary winding Na. However, in an alternative embodiment, the auxiliary winding Na may be omitted, and $V_{SENSE}$ may instead be detected by directly monitoring the voltage across the primary winding Np.

Figure 2:
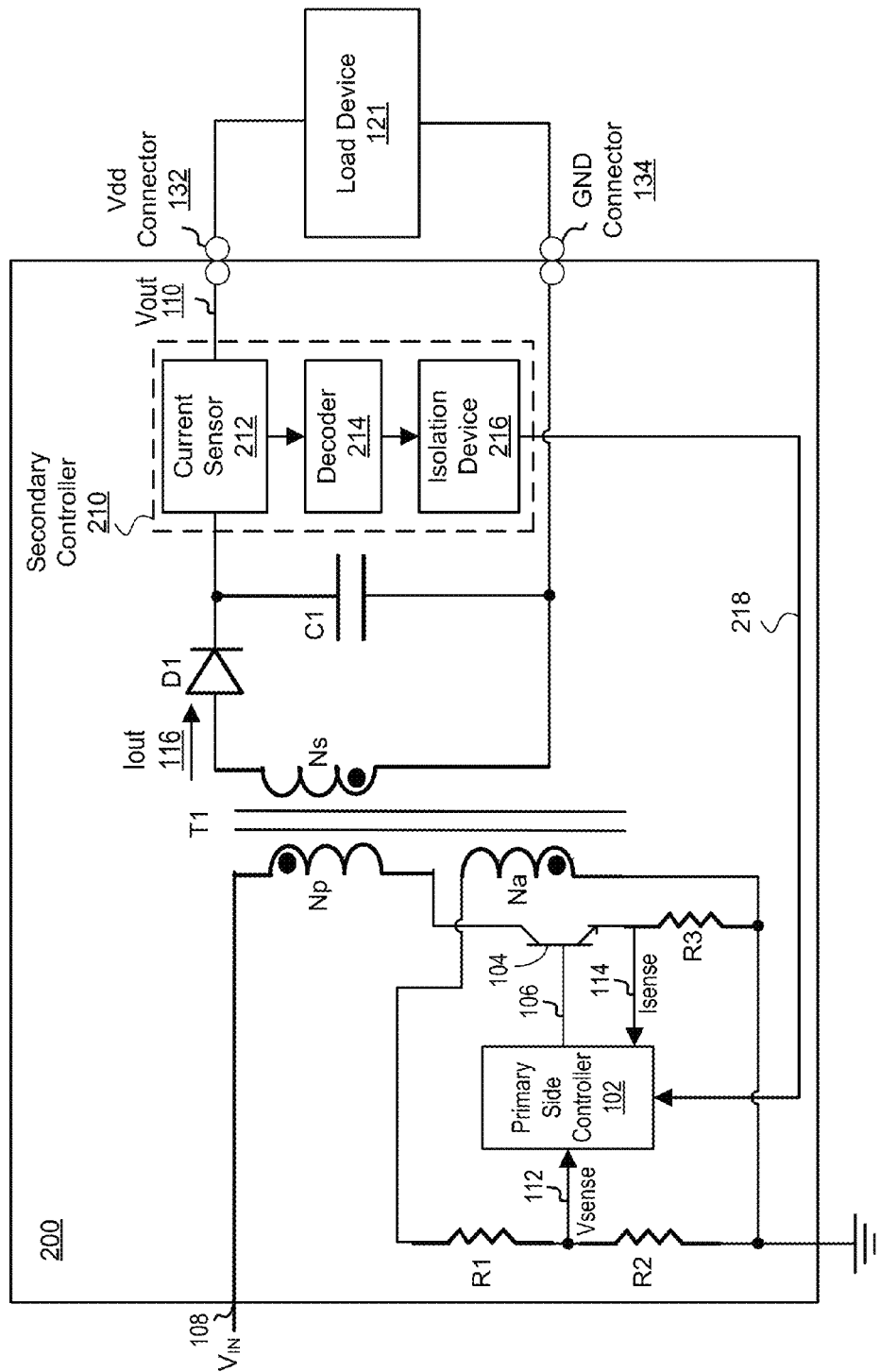
FIG. 2 illustrates an embodiment of a switching power converter with a secondary controller.

FIG. 2 illustrates an example of a power converter 200 similar to the power converter 100 of FIG. 1, but includes a secondary side controller 210 (comprising an output current sensor 212, a decoder 214, and an isolation device 216) to provide secondary detection of a digital message generated by the load device 121. In this embodiment, the load device 121 generates the digital message by controlling an internal switch to turn on or off current to the load according to a recognizable pattern. The modulated secondary load current is sensed via the load current sensor 212 and the pattern is decoded by the decoder 214. The decoded message is then provided to the primary side controller 102 as signal 218 via an isolation device 216, such as an optocoupler. The primary side controller 102 then controls switching of the switch 104 based on the digital message. For example, the digital message may provide a voltage or current for the controller 102 to provide to the load device 121 or select an operational mode compatible with the load device 121 such a constant current mode or constant voltage mode.

Figure 3:
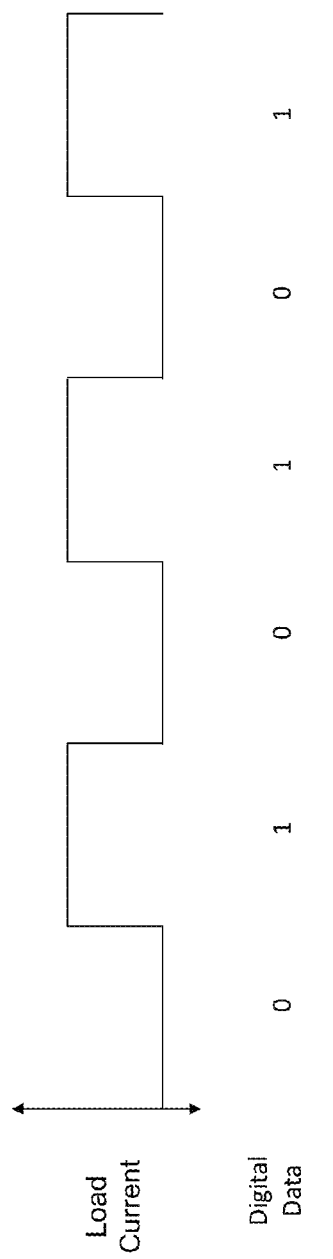
FIG. 3 illustrates a waveform representing a digital message encoded by modulating a load current.

FIG. 3 illustrates an example encoding technique that can be used to encode the digital message. Here, the load device 121 generates a digital message by turning on or off the output current to the load during different predefined time slots. For example, in the illustrated waveform, the load device 121 turns off current to the load to represent a first digital value (e.g., 0) and turns on current to the load (e.g., at a predefined current level) to represent a second digital value (e.g., 1).

Figure 4:
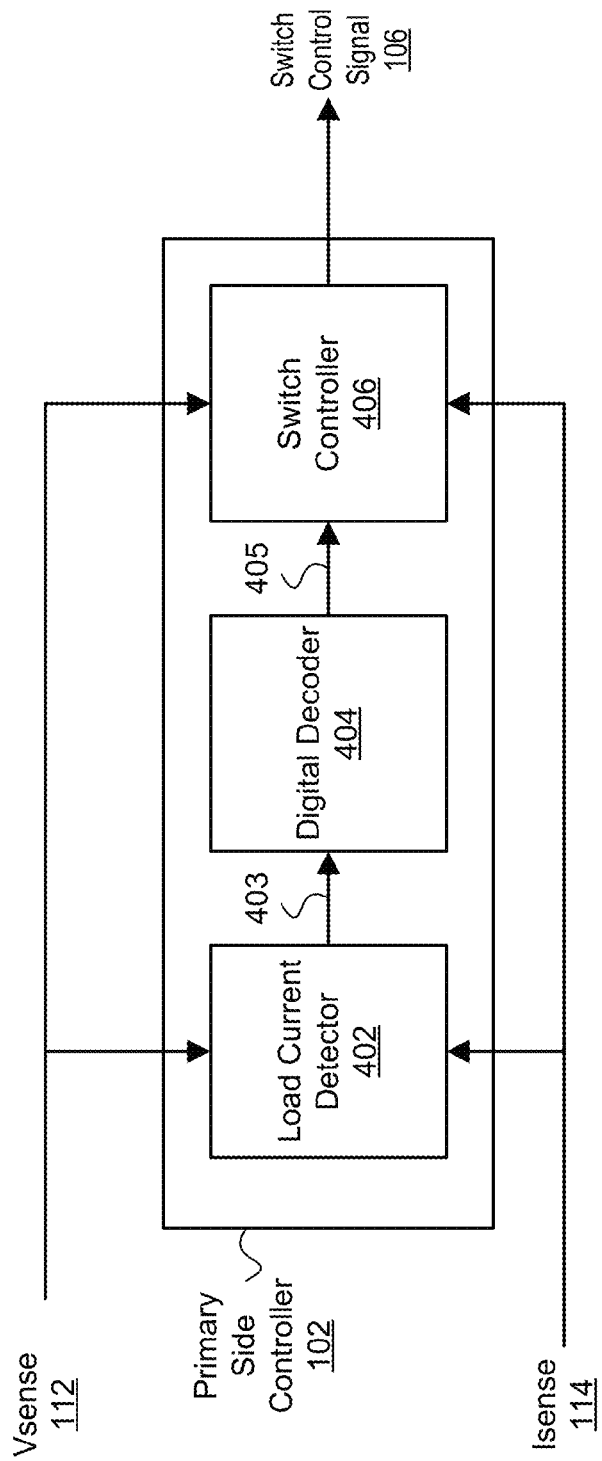
FIG. 4 illustrates an embodiment of a primary side controller for detecting a digital message in a switching power converter.

FIG. 4 illustrates an embodiment of a primary side controller 102 that may be used in conjunction with the power converter 100 of FIG. 1. In this embodiment, the primary side controller 102 detects a digital message generated by the load device 121 using only primary side sensing. The embodiment of FIG. 4 provides a substantial cost benefit relative to the embodiment of FIG. 2 since the secondary side controller 210 is not needed. In this embodiment, the digital message generated by the load device 121 modulating the output current 116 is reflected to the primary side of the transformer T1 and can be detected on the primary side by the primary side controller 102 based on the feedback signals $V_{SENSE}$ 112, Isense 114. For example, in one embodiment, the controller 102 comprises a load current detector 402, a digital decoder 404, and a switch controller 406. The load current detector 402 obtains samples of $V_{SENSE}$ 112 and $I_{SENSE}$ 114. Here, $V_{SENSE}$ 112 is a primary side voltage related to the output voltage (e.g., a divided voltage across an auxiliary winding as shown in FIG. 1). Furthermore, $I_{SENSE}$ 114 represents a primary side current and may be detected, for example, as a voltage across a sense resistor R3 in series with the primary winding Np as shown in FIG. 1. Based on the samples of $V_{SENSE}$ 112 and $I_{SENSE}$ 114, the load current detector 402 generates a load current signal 403 comprising a sequence of load current samples representing current to the load device 121 over a sequence of switching cycles. The digital decoder 404 decodes the load current signal 403 to recover the digital message as signal 405, and provides the recovered message 405 to the switch controller 406. The switch controller 406 then adjusts operation based on the digital message 405. For example, the switch controller 406 controls switching via the switch control signal 106 to achieve a particular output voltage, output current, or operating mode of the switching power converter 100 based on the digital message 405.

Figure 5:
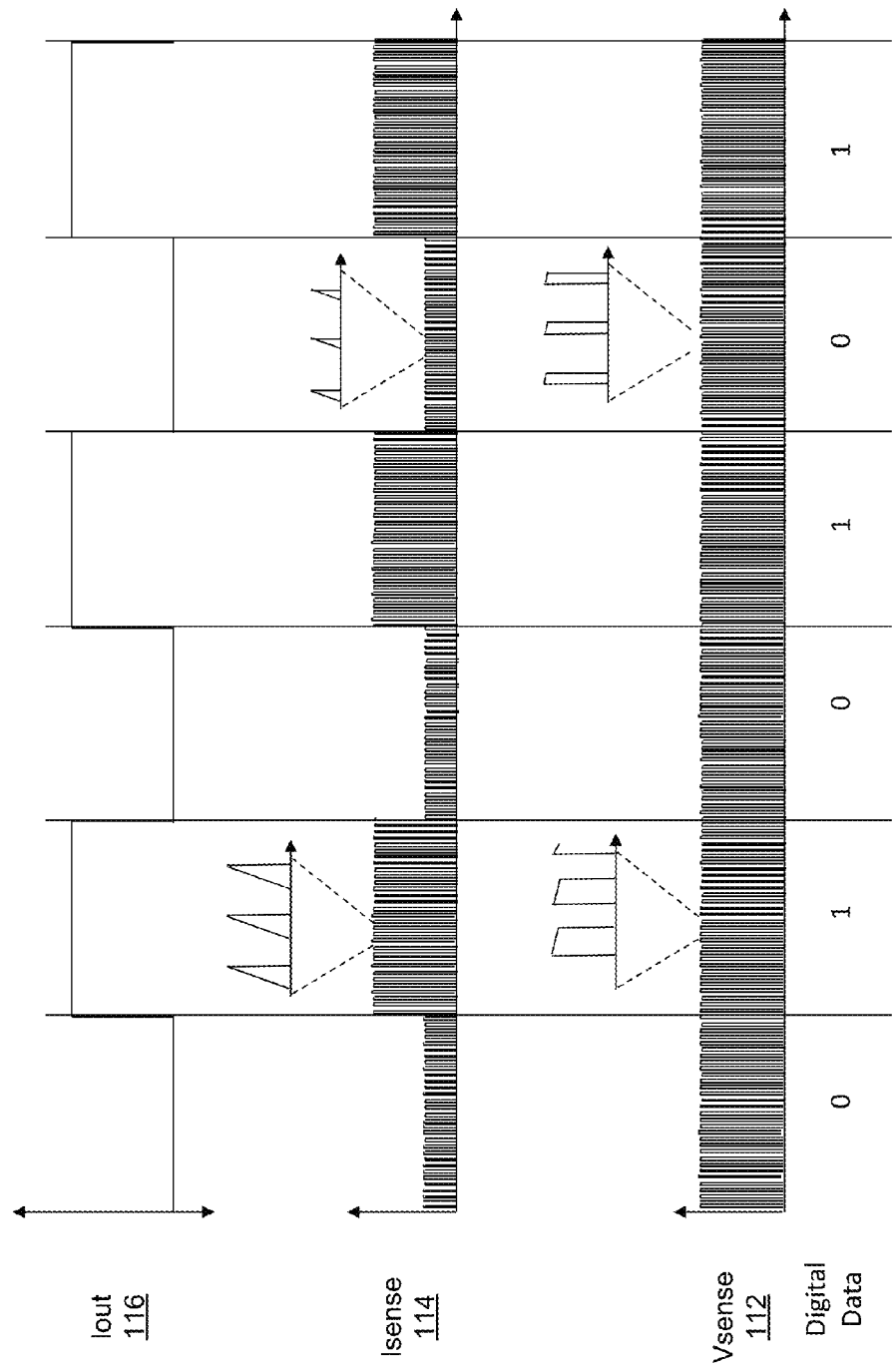
FIG. 5 illustrates example waveforms for various signals present during operation of a switching power converter when communicating a digital message.

FIG. 5 illustrates example waveforms associated with the operation of the power converter 100 having the primary side controller 102 of FIG. 4 described above. In the illustrated example, the load device 121 modulates the load current (e.g., by turning on or off a switch) to be in one of two states (e.g., a on state and an off state) over a sequence of predefined time periods. In the illustrated example, the output current is modulated to alternate between the on state and off state during each period, thus representing the digital values (e.g., 0 1 0 1 0 1). The on and off states of the output current can be detected by monitoring the $I_{SENSE}$ 114 and $V_{SENSE}$ 112 signals. For example, the peak current in the $I_{SENSE}$ signal 114 is higher when the output current 116 is in the on state than when the output current 116 is in the off state. Furthermore, the widths of the voltage pulses in $V_{SENSE}$ 112 are wider when the output current 116 is in the on state than when the output current 116 is in the off state.

Based on the characteristics of the waveforms described above, the load current detector 402 can detect whether the load current is on or off by observing the peak current on the primary side of the controller 102 and comparing it to a threshold value. For example, the output current detector 402 determines that the load current is "on" when the peak current is above the threshold and determines that the load current is off when the peak current is below the same threshold or a different threshold set for hysteresis. However, due to the many different modes that mass produced power adapter/chargers operate in, this threshold method is not always robust to mode variations of the controller particularly if the controller 102 can operate in one of multiple PFM modes or in one of multiple PWM modes of operation, or when the controller is configurable to operate in either Continuous Voltage (CV) or Continuous Current (CC) mode.

To provide more robust detection of the message, the load current detector 402 can estimate the shape of the load current waveform via primary side sensing (as opposed to merely threshold testing of the primary peak current and/or primary voltage). As will be described below, an embodiment of the load current detector 402 detects the load current waveform by applying a digital filter to samples derived from the feedback signals $I_{SENSE}$ 114 and $V_{SENSE}$ 112. In one embodiment, the digital filter operates with variable sampling frequency while maintaining constant bandwidth. A state machine then correlates the filter output to determine patterns. The described technique beneficially provides reliable message recognition without false detection, and furthermore does not require a secondary side sensor.

Figure 6:
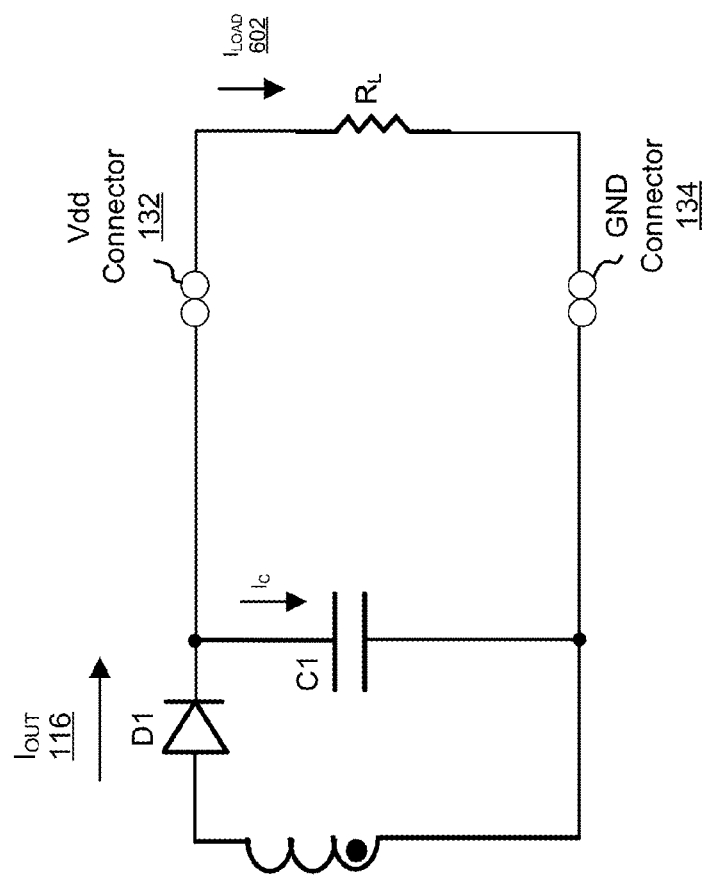
FIG. 6 illustrates an embodiment of a secondary side of a switching power converter.

FIG. 6 illustrates the secondary side of the power converter 100, where the load device 121 is modeled as a resistor $R_L$. The digital message is directly represented by the load current $I_{LOAD}$ 602. The relationship between $I_{LOAD}$ 602 and $I_{OUT}$ 116 is given by:

$$I_{Load} = I_{out} - I_C \quad (1)$$

where $I_C$ is the current going into the capacitor C1. Since it is known that the capacitor C1 and output load (modelled as $R_L$) act as a low pass filter to the current source $I_{OUT}$ 116, $I_{LOAD}$ 602 can therefore be estimated by filtering $I_{OUT}$ 116 if the low pass filter bandwidth is set at or below the natural bandwidth of the system.

Figure 7:
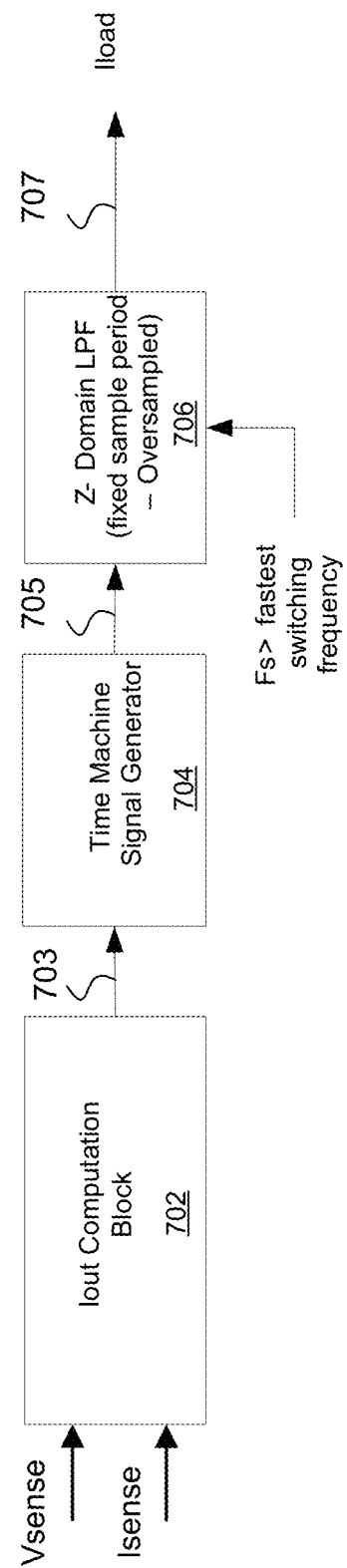
FIG. 7 illustrates an example embodiment of load current detection logic for a primary side controller in a switching power converter.

FIG. 7 illustrates an embodiment of a load current estimator 402 for estimating the load current waveform. At the end of each reset period $T_{RESET}$ of the transformer T1, the average output current over the last sampling period $\langle Iout \rangle_{TS}$ (Where $T_S$ is a sampling period) is determined by the computation block 702 based on samples of $V_{SENSE}$ and $I_{SENSE}$. In one embodiment, $\langle Iout \rangle_{TS}$ can be determined as follows:

$$\langle Iout \rangle_{TS} = \frac{D_{isense}}{2 R_{sense}} \frac{N_p}{N_s} \frac{T_{reset}}{T_{period}} \quad (2)$$

where $D_{isense}$ is a voltage representative of the primary $I_{SENSE}$ peak current threshold $R_{sense}$ is the resistance of the sense resistor R3 on the primary control switch 104, $N_p$ is the number of turns of the primary side winding of transformer T1, $N_S$ is the number of turns of the secondary side winding of transformer T1, $T_{reset}$ is the time for the flyback transformer T1 to fully discharge (in Discontinuous Conduction Mode (DCM)), $T_{period}$ is the period for the power conversion cycle, and $T_S$ is a sampling period. $T_{PERIOD}$, $T_{RESET}$, and $D_{ISENSE}$ can be derived from samples of $I_{SENSE}$ and $V_{SENSE}$. The above relationship is valid for DCM, and is based on the fact that the secondary current is the product of the primary current and the turns ratio at the point where the transformer T1 communicates. The relationship in equation (1) describes the current from the secondary side of the transformer T1 to the output stage of the power converter 100.

In a digital implementation, equation (2) can be simplified as follows:

$$\langle Iout \rangle_{Ts} = \frac{D_{isense} T_{reset}}{T_{period}} \quad (3)$$

This approximation simply removes the constants from equation (2). The approximation is useful because an absolute current measurement is not necessarily needed, and the digital message can be detected based on the shape of the output current as a function of time. In one embodiment, the computation block 702 updates the value $\langle Iout \rangle_{TS}$ once per switching cycle. In some embodiments, (e.g., when using PFM mode), the period of each switching cycle $T_{PERIOD}$ can change.

The time machine signal generator 704 obtains the value of Iout of $\langle Iout \rangle_{TS}$ via signal 703 and synthesizes a signal 705 that represents the value of $\langle Iout \rangle_{TS}$ (held constant) for a duration equivalent to the switching period $T_{PERIOD}$ of the last cycle. The synthesized signal 705 is thus updated at the end of each switching cycle (which may be of variable duration). The synthesized signal 705 is then filtered using a low pass filter 706 to simulate the effect of the output capacitor C1 and load resistance $R_L$ on the output current in order to generate a signal 707 that approximates a waveform of the load current. In one embodiment, the low pass filter 706 is tuned such that it is narrow enough in bandwidth so as to not capture the high frequency noise of the calculated result, but wide enough to support the communicated bit stream through the load current modulation scheme. In one embodiment, the low pass filter 706 is simple, but wide, and a time counter for each cycle is used. The use of a digital filter may be desirable since the input function to the filter is produced by calculations that already exist in the controller. In another embodiment, a continuous time filter may be used.

In order to maintain a constant bandwidth of the signal channel, it is also desirable to oversample the output of this $I_{OUT}$ sequence due to the non-periodic timing of its updates. To avoid aliasing, the signal is sampled at least as fast as the highest PWM frequency used in the system. The Nyquist frequency is one half of the highest PWM frequency.

The form of the filter 706 is a first order low pass seen as follows:

$$G(s) = \frac{1}{1+s\tau} = y_n = \frac{x_n}{1+\tau\frac{d}{dT_s}} \quad (4)$$

$$y_n\left(1+\tau\frac{d}{dT_s}\right) = x_n = y_n + \tau\frac{y_n - y_{n-1}}{T_s} \quad (5)$$

With a little algebra, the filter 706 is defined:

$$y_n = x_n \frac{1}{1+\frac{\tau}{T_s}} + y_{n-1}\frac{\frac{\tau}{T_s}}{1+\frac{\tau}{T_s}} \quad (6)$$

A further simplification of this filter is achieved when $\tau/T_s = 2^n - 1$. When this is true, the multiply operations are easily swapped with shift and add/subtract operations. For example, if n=3 in the above, it simplifies to:

$$y_n = x_n \frac{1}{8} + y_{n-1}\frac{7}{8} \quad (7)$$

When $\tau \gg T_s$, the add functions become quite wide, but there are no multiply operations, thus simplifying a digital implementation of the filter 706.

Figure 8:
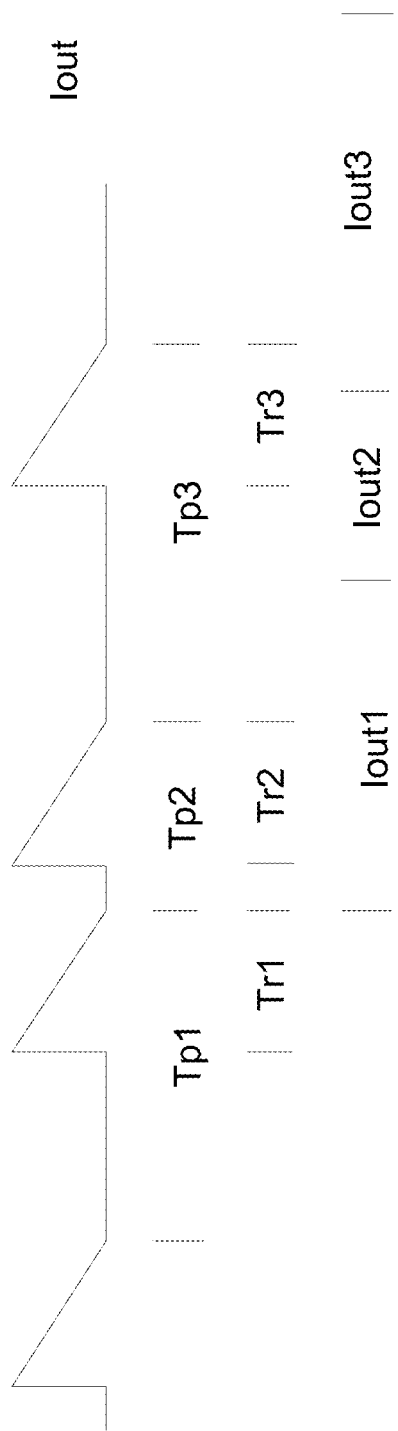
FIG. 8 illustrates example waveforms for an output current of a switching power converter.

FIG. 8 illustrates an example waveform showing operation of the above described load current detector 402 of FIG. 7, In the illustrated waveform, $I_{OUT}$ is the output current from the secondary winding, Tpx is the switching period of a cycle x, and Trx is the transformer reset period associated with the switching cycle x. At the end of each transformer reset period Trx (which also marks the end of the switching period Tp), $\langle I_{OUT}\rangle_{Ts}$ is calculated based on equation (3) (or alternatively, based on equation (2)). In the synthesized output signal, $\langle I_{OUT}\rangle_{Ts}$ is held constant for a duration Ioutx (for a cycle x), which is equal in period to the corresponding measured period Tpx of the cycle for which the calculation was completed.

Figure 9:
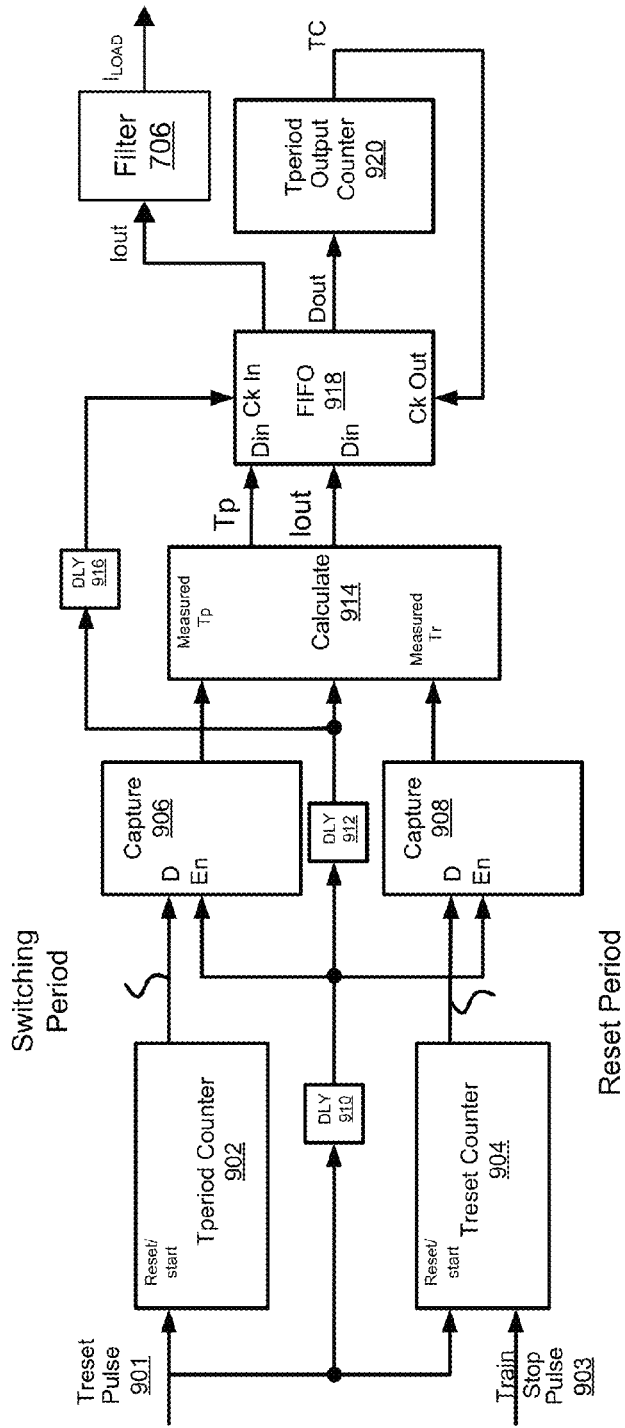
FIG. 9 illustrates a more detailed diagram of load current detection logic for a primary side controller in a switching power converter.

FIG. 9 is a block diagram illustrating an example implementation of the current detector 402 for estimating the load current waveform. In this embodiment, a Treset pulse 901 (e.g., a short pulse) is generated at the end of each transformer reset. A train stop pulse 903 is another short pulse that is generated when the primary switch 104 has been turned off. The switching period $T_P$ is measured by Tperiod counter 902 between two consecutive Treset pulses 901. The Treset counter 904 measures the reset period between a train stop pulse and the next Treset pulse 901. The results of the counters 902, 904 are captured by the capture blocks 906, 908 a short delay (implemented by delay block 910) after the Treset pulse 901 occurs since at this time both counters 902, 904 have the correct values. After another short delay (implemented by delay block 912), the captured values are passed to the calculate block 914 to calculate $I_{OUT}$ based on the measured switching period $T_P$ and the measured reset time $T_R$. Finally after another short delay (implemented by delay block 916), the calculated value for $I_{OUT}$ and the measured switching period $T_P$ are written into the FIFO 918. The FIFO 918 outputs a signal DOUT representing the measured switching period $T_P$ to control the duration of the Tperiod output counter 920. After this counter 920 reaches a terminal count (TC), then it clocks another pair of values ($T_P$ and $I_{OUT}$ for that period) and the cycle repeats. The samples of $I_{OUT}$ can then be read from the FIFO 918 and filtered by filter 706 as described above.

In one embodiment, the depth of the FIFO 918 is determined by the ratio of the largest $T_P$ to the shortest $T_P$ that can happen in adjacent cycles if it is desired to not lose any data. For example if there is a short period where the $D_{iSENSE}$ remains the same, the average current for that cycle is larger due to the small $T_P$, but that large average output current is only present through the short duration of the cycle for which it was calculated. If the value is merely held there until the next calculation, it will appear that this extra current was there for a much longer time, and will introduce undesired noise into the current measurement (and therefore into the communication channel). The extra counter 920 overcomes this problem.

In another embodiment, to avoid using extra counters to ensure that each $I_{OUT}$ value is output for the correct time duration to the filter 706, an alternative embodiment uses a digital filter that is operable with a sample time that varies as the switching frequency varies. With a little algebra, equation (6) can be rewritten in terms of $T_P$ instead of $T_S$:

$$y_n = \frac{x_n T_p + y_{n-1}\tau}{T_p + \tau} \quad (8)$$

With two multiplies, two adds, and one divide, the $T_S$ can be the $T_P$ which is measured each cycle. From this, one can easily see that if $T_P$ is short, the influence of the input is reduced. Although the arithmetic is slightly increased with this rendition, the counter (time machine signal generator 704) is not used. In equation (8), $$x_n = Ipk_n \frac{T_{reset}}{T_p},$$

so the final equation reduces to:

$$y_n = \frac{Ipk_n T_{reset} + y_{n-1}\tau}{T_p + \tau} \quad (9)$$

Figure 10:
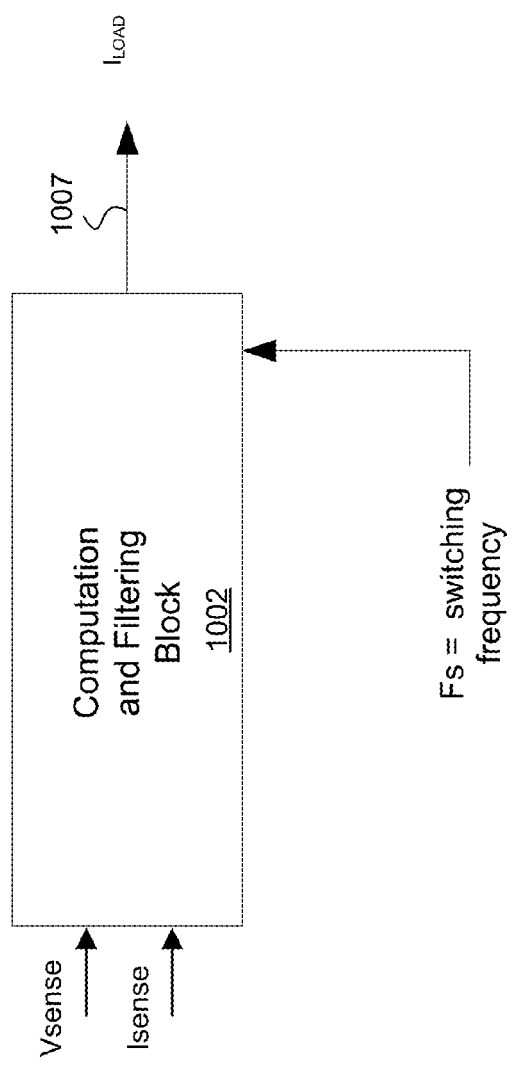
FIG. 10 illustrates another embodiment of load current detection logic for a primary side controller in a switching power converter.

FIG. 10 is block diagram illustrating this alternative method for estimating the load current. This implementation uses a computation and filtering block 1002 to output a signal 1007 representing the load current waveform using a variable sampling frequency. This implementation has more full multiplications, and still has wide registers due to the fact that tau is much greater than some $T_P$ values. However, this method has the advantage of not using the time machine signal generator 704.

In another embodiment, the accuracy of the estimation of the load current waveform can be further improved by accounting for the fact that the current through the diode D1 be either going into our out of the output capacitor C1.

As was shown before, the relationship is as follows:

$$I_{Load} = I_{out} - I_C \quad (10)$$

$I_C$ can be determined by the relationship:

$$I_C = C \frac{dV_{out}}{dT_s} \quad (11)$$

Equation (11) can be used when C is known. Even if the exact value of C is not known, but it is known to be within a certain range, a second order correction can still be applied to enhance the accuracy some. $V_{out}$ and $T_S$ values can be determined based on the samples of $I_{SENSE}$ and $V_{SENSE}$. In another alternative embodiment, these parameters can be user-configurable.

As described above with respect to FIG. 4, once the load current waveform is estimated by the output current detector 402, the digital decoder 404 decodes the digital message from the waveform. Particularly, the digital decoder 404 perform a pattern recognition function to determine which pattern was the most likely to have been received from the samples representing the load current waveform. In communications theory, this function may be performed with a maximal likelihood detector which consists of a matched filter, which is also equivalent to an integration of the product of what is expected versus what is received. This can be performed on a bit by bit basis, or on a message by message. A maximal likelihood estimation of x for example is the value of x which makes the observed data the most probable. If a given message is cross correlated with every possible pattern in the space of available codes, the pattern that shows the highest cross correlation with the observed data is the most likely to have been transmitted.

A matched filter is the filter that yields the highest signal-to-noise ratio (SNR) at its output. A matched filter has an impulse response that is the flipped in place version of the expected signal. Since the filter performs convolution in the time domain, this is numerically the same as correlation. If a bank of correlation functions is operated over the duration of the symbol, the one that has the highest cross correlation points to the most likely symbol to have been transmitted. These correlation operations do not need to slide if the beginning of the symbol can be accurately determined.

The above described functions can be costly in terms of numerical processing requirements. For a very slow data rate pattern where only two patterns exist, this system can be considerably simplified while maintaining robust operation that will reliably detect patterns without false positives. In the power conversion scheme, it is generally better to miss a message than to falsely decide one was received, resulting in an output voltage or current change that was not requested by the load device.

In one embodiment, the digital decoder 404 comprises a bank of state machines that are expecting each pattern based on "on" and "off" times. If there is a mistake in the pattern, the state machine goes to its beginning state, and waits for the correct pattern.

Figure 11:
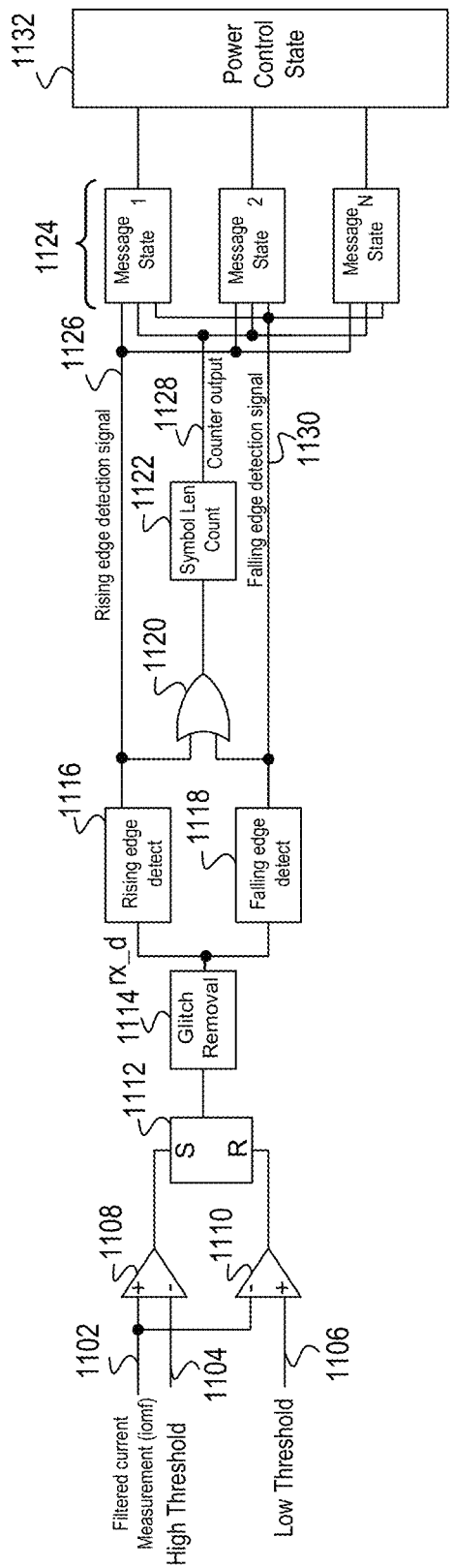
FIG. 11 illustrates example logic for a digital decoder in a primary side controller in a switching power converter.
Figure 12:
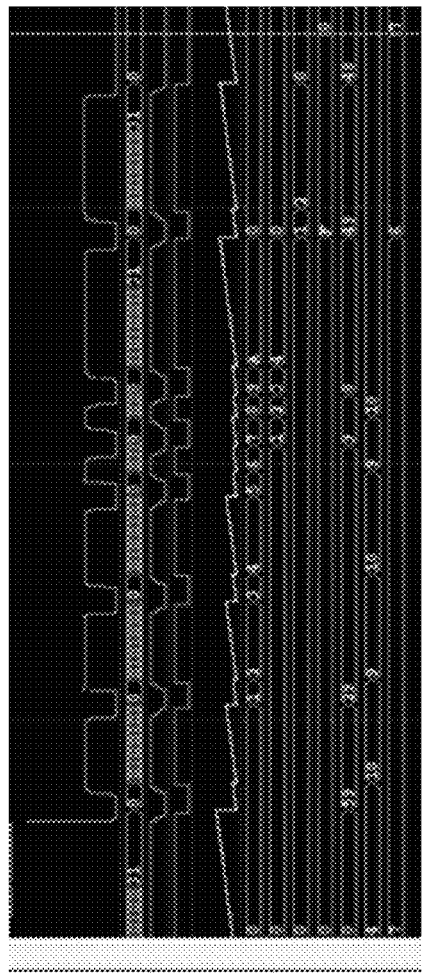
FIG. 12 illustrates example waveforms associated with operation of a digital decoder in a primary side controller in a switching power converter.

FIG. 11 is an example embodiment of a digital decoder 404 and FIG. 12 illustrates a simulation of the digital decoder 404 of FIG. 11 for example inputs. Although FIGS. 11-12 describe a digital implementation, parts of it can be done with analog equivalent functions.

The estimated load current waveform is first de-glitched with a digital time filter that ensures that if the logic state changes, it remains in the changed state for a minimum time before the output of the filter changes to the new state. There is a group delay through the filter, but this does not affect performance since it is a minor delay and is applied to all transitions, thus differential time measurements are not affected. After the above processing, the resulting deglitched signal is processed by a bank of state machines that are each monitoring for the expected message pattern. The state machine is an event based machine and it advances with each transition in the filtered and de-glitched received signal.

In the block diagram, the filtered current measurement ("iomf" in FIGS. 11-12) 1102 representing the load current waveform is compared against a high threshold 1104 and a low threshold 1106 by a pair of comparators 1108, 1110. The outputs of the comparators 1108, 1110 control an SR flop 1112. In the Glitch Removal block 1114, a deglitch operation is performed by using a counter. The glitch removal block 1114 ensures that the output of the raw received data stays in a particular state for more than a specified number of clock cycles before the transition is seen on the output of the signal "rx_d". The counting operation is demonstrated in the waveform of FIG. 12 in the signal "rx_d_cnt". This counter ramps all the way to its max or down to its minimum before the output "rx_d" is changed to the new state of the raw signal. If the raw signal changes back to its original value before this happens, the counter is set to the rail that corresponds to the previous setting. This ensures that a change is seen for a specified number of clock signals before it is propagated to the "rx_d" signal. The "rx_d" signal in the waveform of FIG. 12 corresponds to the output of the block "glitch removal" in FIG. 11.

The "rx_d" signal is then processed to detect rising and falling edges by a rising edge detection block 1116 and a falling edge detection block 1118 respectively. These edges are logically "OR'd" together by an OR gate 11120 to be used as a counter reset. A free running counter 1122 outputs a signal shown as "sym_cnt" in the waveform of FIG. 13. It appears as an analog saw-tooth waveform, where the counter is reset at every edge.

There are multiple message state machines 1124 in parallel that each receive 3 inputs; a rising edge detection signal 1126, a falling edge detection signal 1128, and a captured counter output 1130 which is the output of the counter 1122 at the last edge (either rising or falling). With these inputs, each Message State Machine 1124 is tuned for reception of one message. The outputs of the message state machines 1124 control the power control state block 1132, which configures the power state of the power converter 100.

Figure 13:
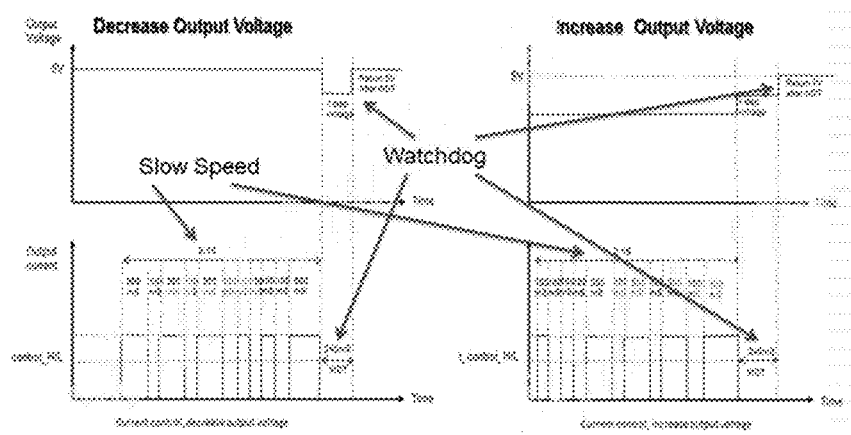
FIG. 13 illustrates additional example waveforms associated with operation of a digital decoder in a primary side controller in a switching power converter.

In alternative embodiments, a different message decoding system may be used. For example, alternative messaging formats may include start, stop, parity, or data bits. Although the techniques described herein are well suited for relatively slow message systems with a limited number of symbols, the method is also usable for faster speeds and more complex communications protocols. FIG. 13 defines an embodiment of a message pattern. A watchdog method is also defined here, which is a different form of message. The messages are relatively orthogonal (not easily mistaken one for another) and the likelihood of a false positive is very low.

Figure 14:
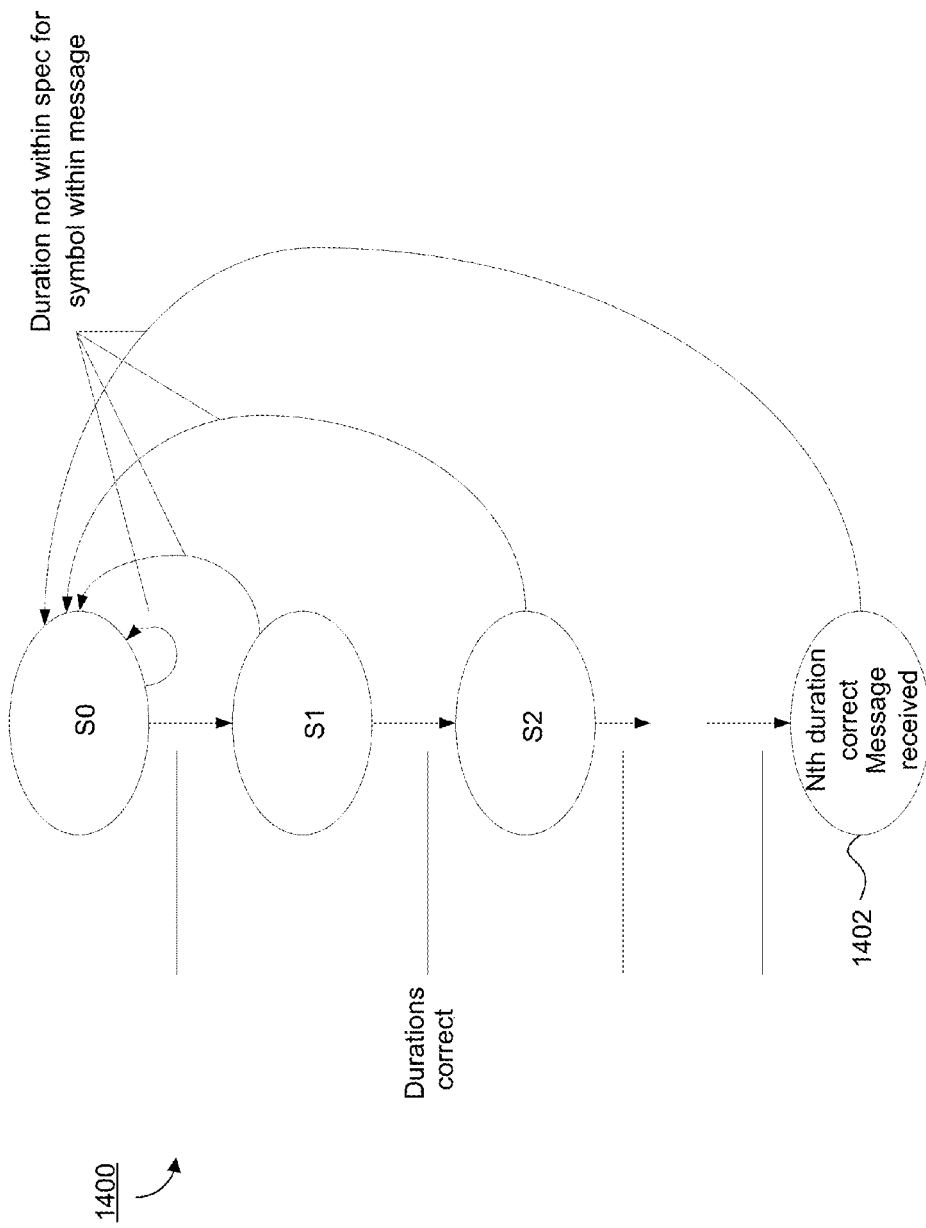
FIG. 14 illustrates an example embodiment of a state machine associated with operation of a digital decoder in a primary side controller in a switching power converter.

FIG. 14 is a state machine diagram illustrating an embodiment of a state machine 1400 that can be used in the architecture described above. Every transition in the state diagram means that a rising or falling edge of the filtered output has occurred. Each time this does occur, the time windows are checked and the state machine 1400 advances according to the result of the windows associated with the state from which it is proceeding from. When the last state 1402 is arrived at, then the message is considered to have been received.

The transitions that advance the state machine 1400 are based on the correct edge detection combined with the captured count being within a defined window. This determines that this high or low period was as expected for this message. Any time this condition is not met (an edge occurs at the wrong time), the state machine 1400 is reset (returns to state S0), and begins waiting for a new message.

In the embodiment illustrated, there are 2 message types; an "increase" and a "decrease" message. The purpose of these messages are to increase or decrease the regulation voltage value after the message is received. The messages could have very different purposes. The state variable for each of these machines is displayed in the waveform of FIG. 12 as "st_inc" and "st_13 dec" respectively.

The example message in FIG. 12 is a "decrease" message. Observation of "st_inc" and "st_dec" indicates that the increase state machine made it all the way through to message completion; while the state machine for the "increase" message only got part of the way through, because it is the wrong message. The state machines are also coordinated to one another such that if any of them sees a message complete, they are all reset, so that they start watching for the next message at the same time.

Upon reading this disclosure, those of skill in the art will appreciate still additional alternative embodiments through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope described herein.

The invention claimed is:

1. A switching power converter to provide power to an electronic device based on a digital message generated by the electronic device, the electronic device generating the digital message by modulating a load current to the electronic device according to a predefined pattern, the switching power converter comprising:
   a transformer electrically isolating a secondary side of the switching power converter coupled to the electronic device from a primary side;
   a load current detector to obtain samples of a primary side voltage sense signal representative of a primary side voltage and samples of a current sense signal representing a primary side current, the voltage sense signal and the current sense signal varying based on the modulated load current to the electronic device, the load current detector to generate a load current signal, representing a waveform of the modulated current to the electronic device based on the samples of the voltage sense signal and the samples of the current sense signal;
   a digital decoder to decode the load current signal to recover the digital message encoding by the electronic device; and
   a power controller to control switching of a switch to control at least one of an output voltage and an output current to the electronic device based on the voltage sense signal, the current sense signal, and the digital message.

2. The switching power converter of claim 1, wherein the load current detector comprises:
   an output current computation block to determine, based on the samples of the voltage sense signal and the samples of the current sense signal, an average current through a secondary winding of the transformer during a previous switching cycle of the power converter;
   a time machine signal generator to generate an output current signal comprising a sequence of samples representing the average current, the sequence of samples having a duration of the previous switching cycle of the power converter; and
   a low pass filter to filter the output current signal to estimate the load current signal.

3. The switching power converter of claim 2, wherein the output current computation block determines the average current at an end of each reset period of the transformer.

4. The switching power converter of claim 2, wherein the output current computation block comprises:
   a first counter to receive a reset pulse at an end of a reset period of the transformer and to measure a switching period based on a time difference between consecutive reset pulses;
   a second counter to receive the reset pulse at the end of the reset period and to receive a train stop pulse when the switch is turned off, and to measure a reset period based on a time difference between the train stop pulse and the reset pulse; and
   calculate logic to determine the average output current based on the measured switching period and the measured reset period.

5. The switching power converter of claim 2, wherein the time machine signal generator comprises:
   a first-in-first-out (FIFO) buffer to receive a signal representing the average current and to receive a signal representing the duration of the previous switching cycle; and
   a counter to advance the FIFO buffer after a time period based on the duration of the previous switching cycle.

6. The switching power converter of claim 2, wherein the switching power converter operates according to a pulse frequency modulation control scheme, and wherein a duration of the switching cycle varies for different switching cycles.

7. The switching power converter of claim 2, wherein the low pass filter comprises:
   an oversampling first order low pass digital filter having a fixed sampling rate.

8. The switching power converter of claim 2, wherein the low pass filter comprises:
   a low pass digital filter having a sample rate that varies based on a switching period of the switching power converter.

9. The switching power converter of claim 1, wherein the digital decoder comprises:
a digital state machine to change from a first state to a second state responsive to detecting a transition between logic states in the load current signal and to decode the digital message based on reaching a final state of the digital state machine.

10. The switching power converter of claim 1, wherein the power converter provides power to a Universal Serial Bus (USB) device via a Vbus line.

11. A method for detecting a digital message generated by an electronic device coupled to a secondary side of a switching power converter, the switching power converter comprising a switch for controlling current through a transformer that electrically isolating the secondary side from a primary side, the electronic device encoding the digital message by modulating a load current to the electronic device according to a predefined pattern, the method comprising:
obtaining, by a primary side controller on the primary side of the switching power converter, samples of a primary side voltage sense signal representative of a primary side voltage and samples of a current sense signal representing a primary side current, the voltage sense signal and the current sense signal varying based on the modulated load current to the electronic device;
generating a load current signal representing a waveform of the modulated current to the electronic device based on the samples of the voltage sense signal and the samples of the current sense signal;
digitally decoding the load current signal to recover the digital message encoded by the electronic device; and
configuring a mode of the primary side controller based on the recovered digital message.

12. The method of claim 11, wherein generating the load current signal comprises:
determining, based on the samples of the voltage sense signal and the samples of the current sense signal, an average current through a secondary winding of the transformer during a previous switching cycle of the power converter;
generating an output current signal comprising a sequence of samples representing the average current, the sequence of samples having a duration of the previous switching cycle of the power converter; and
low pass filtering the output current signal to estimate the load current signal.

13. The method of claim 12, wherein determining the average current comprises:
detecting an end of a reset period of the transformer; and
determining the average current at the end of the reset period.

14. The method of claim 12, wherein determining the average current comprises:
receiving a reset pulse at an end each reset period of the transformer;
receiving a train stop pulse each time the switch is turned off;
measuring a switching period based on a time difference between consecutive reset pulses;
measuring a reset period based on a time difference between the train stop pulse and the reset pulse; and
determining the average output current based on the measured switching period and the measured reset period.

15. The method of claim 12, wherein generating the output current signal comprises:
storing values representing the average current and values representing the duration of the previous switching cycle in a first-in-first-out (FIFO) buffer; and
using a counter to advance the FIFO buffer after a time period based on the duration of the previous switching cycle.

16. The method of claim 12, wherein the switching power converter operates according to a pulse frequency modulation control scheme, and wherein a duration of the switching cycle varies for different switching cycles.

17. The method of claim 12, wherein low pass filtering the output current signal comprises:
applying an oversampling first order low pass digital filter having a fixed sampling rate.

18. The method of claim 12, wherein low pass filtering the output current signal comprises:
applying a low pass digital filter having a sample rate that varies based on a switching period of the switching power converter.

19. The method of claim 11, wherein digitally decoding the load current signal comprises:
changing a state of a digital state machine from a first state to a second state responsive to detecting a transition between logic states in the load current signal; and
decoding the digital message based on reaching a final state of the digital state machine.

20. The method of claim 11, wherein the power converter provides power to a Universal Serial Bus (USB) device via a Vbus line.

* * * * *